United States Patent
Fernandez

(10) Patent No.: US 9,132,324 B2
(45) Date of Patent: Sep. 15, 2015

(54) ALL POTTERY CLAY GOLF PUTTER HEAD

(76) Inventor: David Robert Fernandez, Seagrove, NC (US)

( * ) Notice: Subject to any disclaimer, the term of this patent is extended or adjusted under 35 U.S.C. 154(b) by 123 days.

(21) Appl. No.: 13/605,994

(22) Filed: Sep. 6, 2012

(65) Prior Publication Data
US 2014/0066225 A1    Mar. 6, 2014

(51) Int. Cl.
| A63B 53/04 | (2015.01) |
| A63B 53/00 | (2015.01) |
| B28B 1/02 | (2006.01) |
| B28B 3/02 | (2006.01) |
| B28B 11/12 | (2006.01) |

(52) U.S. Cl.
CPC .............. *A63B 53/04* (2013.01); *A63B 53/007* (2013.01); *A63B 53/0487* (2013.01); *B28B 1/025* (2013.01); *B28B 3/02* (2013.01); *B28B 11/12* (2013.01); *A63B 2209/00* (2013.01)

(58) Field of Classification Search
CPC .............................. A63B 3/0487; A63B 53/04
USPC ................................................. 473/340–341
See application file for complete search history.

(56) References Cited

U.S. PATENT DOCUMENTS

| 2,908,502 | A | 10/1959 | Bradstreet |
| 3,975,023 | A | 8/1976 | Inamori |
| 4,181,306 | A | 1/1980 | Jepson |
| 4,793,616 | A | 12/1988 | Fernandez |
| 5,037,102 | A | 8/1991 | Fukayama et al. |
| 5,340,107 | A | 8/1994 | Baker et al. |
| 6,328,661 | B1 | 12/2001 | Helmstetter et al. |
| 8,025,589 | B2 * | 9/2011 | Brinton et al. ............... 473/290 |
| 2004/0142762 | A1 * | 7/2004 | Bunker ........................ 473/340 |

FOREIGN PATENT DOCUMENTS

| JP | 2002306649 A | * | 10/2002 | ............. A63B 53/04 |
| JP | 2003305143 A | * | 10/2003 | ............. A63B 53/04 |

OTHER PUBLICATIONS

Abstract KR 20040092369 A, Kim Sung Soo, "Composition and method for making golf club putter head comprising bone, ash, feldspar and clay", Nov. 3, 2004.*

* cited by examiner

Primary Examiner — Stephen Blau
(74) Attorney, Agent, or Firm — Robert W. Pitts

(57) ABSTRACT

A golf putter head is made entirely of pottery clay and can have a glazed body and an unglazed striking face. This putter head is preferably fabricated by forming a basic disc shape on a potter's wheel and then removing a portion of the disc shape away to form a striking face. A putter with a mallet shaped head can be formed. After drying, the clay can be glazed and then fired. The putter head can alternatively be fabricated using a ram press molding technique.

9 Claims, 2 Drawing Sheets

ALL POTTERY CLAY GOLF PUTTER HEAD

BACKGROUND OF THE INVENTION

1. Field of Invention

The invention relates to a golf putter head, more specifically to a putter head made entirely of pottery clay with a glazed exterior surface and an unglazed striking face.

2. Prior Art

The most important features of a golf putter are its appearance, feel, and function. The aesthetic appearance of a golf club putter is one of the most important features in the consumer's acceptance of a golf club. Many conventional golf putters are polished or painted to provide a reflective surface. In normal use these surfaces tend to wear or patina over a period of time. The present invention is superior in that the surface is permanent and remains aesthetically pleasing.

The prior art known to the applicant comprises the following U.S. patents which relate to the present invention. These include U.S. Pat. No. 2,908,502 to Bradstreet who uses ceramic composites to coat the surface of a metal golf club. U.S. Pat. No. 3,975,023 to Inamori, U.S. Pat. No. 4,181,306 to Jepson, U.S. Pat. No. 5,037,102 to Fukayma, and U.S. Pat. No. 6,328,661 to Helmstetter are directed to golf club heads that have a ceramic composite or polyurethane face insert. U.S. Pat. No. 4,630,826 to Nishigaki is directed to a golf club head with a plurality of ceramic plates and layers of glass fibers or carbon fibers laminated alternately, allowing for a change of hardness and roughness of the ball-striking surface. U.S. Pat. No. 4,793,616 to Fernandez is directed to the use of a foam core surrounded by a rigid shell including resin impregnated fibers and ceramic particles dispersed in the resin. U.S. Pat. No. 5,340,107 to Baker is directed to a dry pressed silicon nitride composite monolithic ceramic putter whose main focus is on the weighting system and the method of manufacturing using bi-axial symmetric pressure to form the unique shape of the golf club. The finishing is completed with sandblasting and diamond lapping to polish the surface.

SUMMARY OF THE INVENTION

The present invention is for a golf putter head made entirely of pottery clay, usually stoneware or porcelain with an aesthetically pleasing glazed exterior and an unglazed striking face. The body of the putter head is formed using traditional pottery forming techniques. After firing the vitrified clay putter head has the weight and density to function as a standard golf putter head with a "soft feel" when striking a golf ball.

A golf club putter head according to this invention is formed entirely of pottery clay, usually stoneware or porcelain, with a glazed exterior and an unglazed striking face.

The glazed vitrified putter head according to this invention is aesthetically pleasing.

The glazed vitrified putter head according to this invention is functional.

The putter head according to this invention has a "soft feel" when putting a golf ball.

The putter head according to this invention can be formed by traditional pottery forming techniques using pottery clay in an uncommon way.

DETAILED DESCRIPTION OF THE PREFERRED EMBODIMENT

Figure 1:
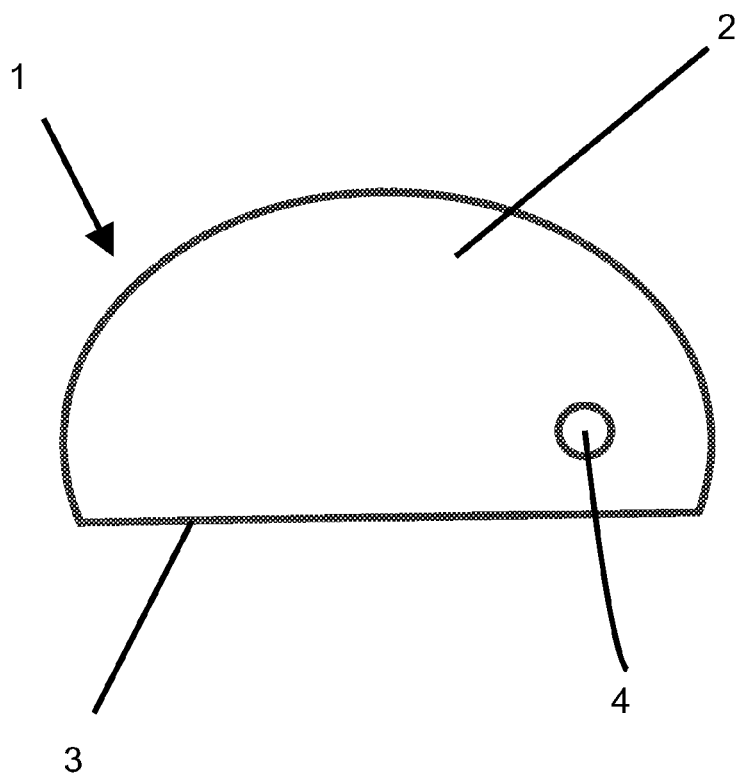
FIG. 1 is the top view of the putter head of the present invention showing the drilled hole 4 for the putter shaft.
Figure 2:
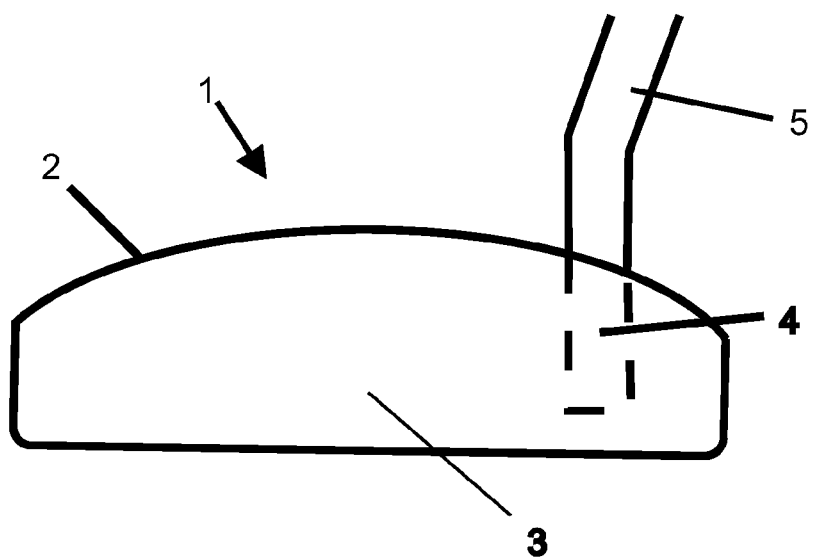
FIG. 2 is the front view of the putter head of the present invention with the shaft attached.
Figure 3:
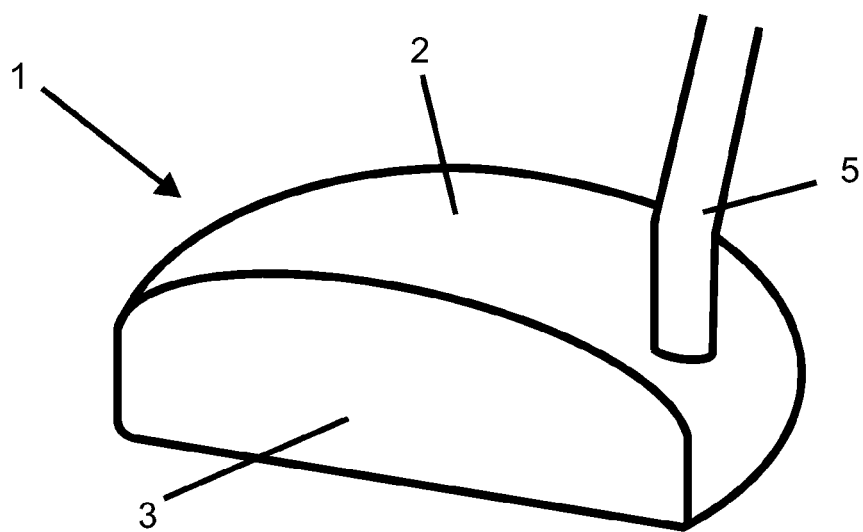
FIG. 3 is a perspective of the putter head of the present invention.

The principal object of the present invention is to provide a unique functional golf putter head 1 that is aesthetically pleasing.

It is an additional object of the present invention to provide a golf putter head 1 that has a permanent exterior surface.

It is still an additional object of the present invention to use pottery clay and traditional pottery forming techniques to create a golf putter head 1 that capitalizes on the inherent properties of vitrified clay for an unusual, but very functional application.

A golf putter head 1 made entirely of pottery clay, typically stoneware or porcelain, with a glazed body 2 and an unglazed striking face 3. The present invention is preferably fabricated by forming the basic disc shape of the putter head 1 on the potter's wheel. Cutting a portion of the wet clay disc to make a traditionally shaped "mallet" putter head 1 forms the striking face 3. After drying, the clay putter head 1 is glazed and then fired to a temperature that vitrifies the clay and allows the exterior glaze to melt. A hole 4 is then drilled in the top of the finished putter head 1 for the putter shaft 5 to be glued into place. The invention may also be fabricated using a ram press molding technique.

The present invention capitalizes of the inherent nature of vitrified clay. Vitrified clay is strongest in compression. Just observe an all brick building. With a mallet putter head 1 shape the full depth of the putter head 1 supports the portion of the striking face 3 where the golf ball is generally hit. The weight and strength of the vitrified clay makes it functional as a putter head 1.

Many of the newer metal putters have an insert of composite ceramic material embedded in the striking face 3 to create a "soft feel" when striking the golf ball. The density of vitrified pottery clay is a similar to these composite materials. With a density less than most metals, but greater that a golf ball, the all clay putter head 1 has a "soft feel".

Forming clay on a potter's wheel is nothing new. However forming solid discs of clay to make a putter head 1 is. The centering of the clay aligns the clay particles in a concentric pattern that adds to the strength of the thrown object. When the clay disc is cut to form the striking face 3 of the putter head 1, the ends of the concentric clay particles are exposed, adding to the strength of the structure.

I claim:

1. A golf club, comprising a putter, with a club head formed of fired pottery clay to which a shaft is attached, wherein the club head includes an unglazed clay striking face with the remainder of the exterior surface of the club head being glazed wherein clay particles forming the club head forming form concentric circles that have been cut to form the striking face so that cut ends of clay particles forming the concentric circles are exposed to add strength to the club head.

2. A golf putter having a putter head in the form of a truncated disc with a striking face truncating the disc on one side, the putter head being formed of pottery clay with the clay forming concentric circles and with cut ends of clay particles forming the concentric circles being exposed on the striking face.

3. The golf putter of claim 2 wherein the exterior face of the putter head, with the exception of the striking face, being glazed.

4. The golf putter of claim 2 wherein the striking face is unglazed.

5. The golf putter of claim 2 wherein the putter head is formed of vitrified pottery clay.

6. The golf putter of claim 2 wherein the pottery clay forming the putter head has been fired.

7. The golf putter of claim 2 wherein the putter head comprises a mallet head putter.

8. The golf putter of claim 2 wherein a hole in the putter head receives a club shaft.

9. The golf putter of claim 2 wherein an aesthetically pleasing glazed surface is formed on the exterior of the putter head.

* * * * *